UNITED STATES PATENT OFFICE.

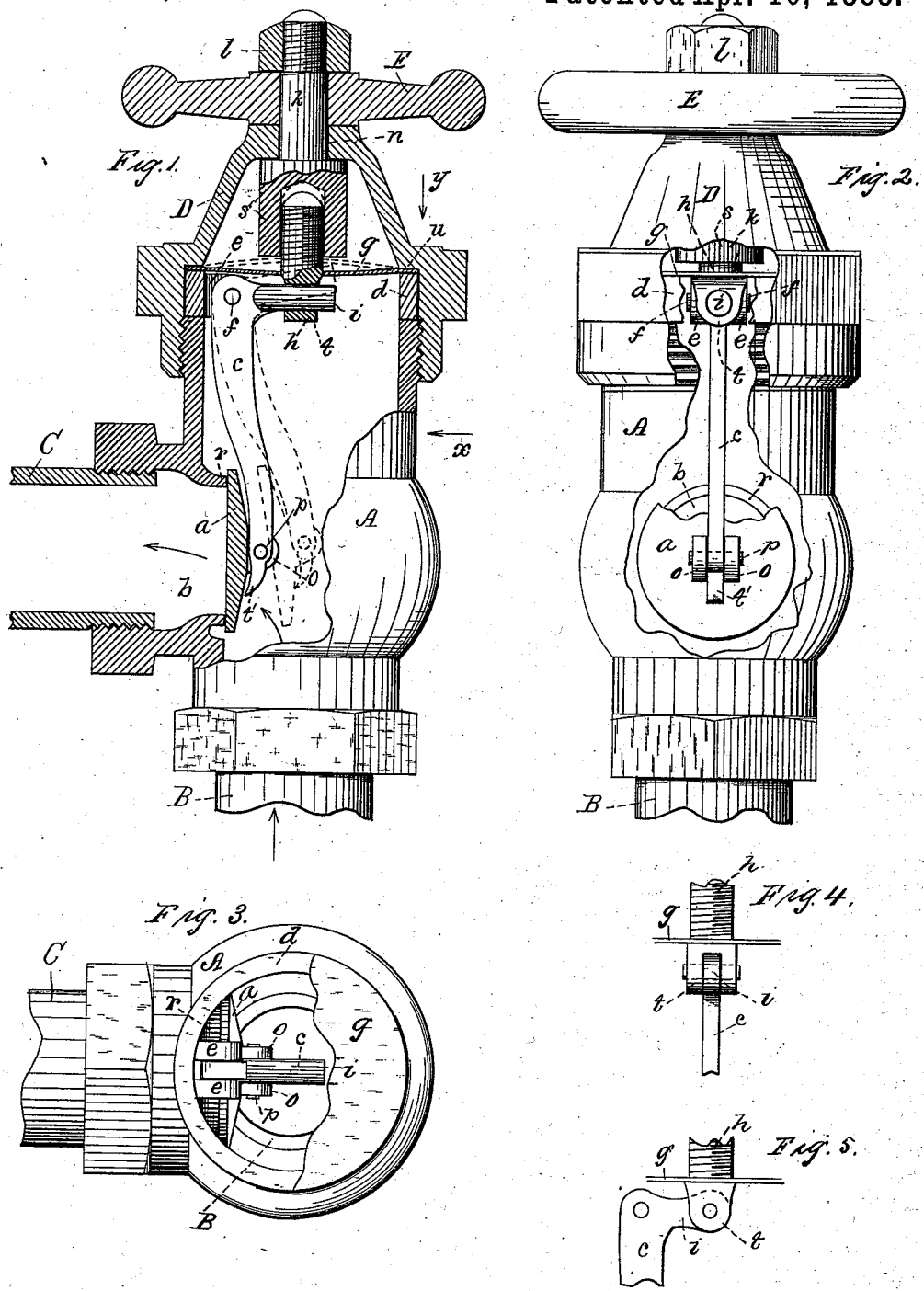

JOHN A. CREELMAN, OF ROCHESTER, NEW YORK, ASSIGNOR OF ONE-HALF TO GEORGE H. GRAHAM, OF SAME PLACE.

STOP-VALVE.

SPECIFICATION forming part of Letters Patent No. 381,055, dated April 10, 1888.

Application filed February 8, 1888. Serial No. 263,338. (No model.)

*To all whom it may concern:*

Be it known that I, JOHN A. CREELMAN, of Rochester, in the county of Monroe and State of New York, have invented a new and useful Improvement in Stop-Valves, which improvement is fully set forth in the following specification and shown in the accompanying drawings.

The object of my invention is to produce new and novel means for operating a valve within a steam or water tight globe or inclosure by a handle without, without resorting to the use of a stuffing-box to make the inclosure complete, the invention being hereinafter fully described, and more particularly pointed out in the claims. I aim to connect the external handle with the valve within the inclosure by intermediate parts, including a flexible diaphragm to close the mouth of the inclosure, which diaphragm is made rigid with one of the intermediate parts between the handle and valve, and moves with said part as the latter is moved to open or close the passage-way out of said inclosure by means of the valve. This device may be used for steam, gas, or other fluids; but I design it more particularly to be used with hot water, connected with a radiator for heating purposes.

Referring to the drawings, Figure 1 is a central longitudinal section of a part of the shell of a globe-valve with attached parts, some of the parts being shown in two positions by full and dotted lines; Fig. 2, an elevation of the device seen as indicated by arrow $x$ in Fig. 1, parts being broken away to uncover interior parts; Fig. 3, a view of the device seen as indicated by arrow $y$ in Fig. 1, some of the upper parts being omitted and the diaphragm in part broken away. Figs. 4 and 5 represent different elevations of another simple method of joining some of the parts.

Referring to the parts of the device shown in the drawings, A is the globe or shell of a globe-valve, substantially of common form.

B is a pipe leading into the globe, and C a pipe leading out therefrom.

$a$ is a circular disk or valve operated to open or close the passage-way $b$ out through the pipe C.

$c$ is a bent bar or lever joined to the valve to operate the latter.

$d$ is a ring resting upon the upper end of the globe, said ring being formed with internally-projecting lugs $e$, between which the lever or bar $c$ is pivoted upon a pin, $f$.

$g$ is a tight circular diaphragm having a diameter equal to that of the exterior of the ring, placed upon the latter to tightly close the upper opening of the globe.

$h$ is a threaded stud passing vertically through a central opening in the diaphragm, to which latter it is made rigid and joined with a steam-tight joint. This plug is joined to the short arm $i$ of the lever beneath the diaphragm, and in the water-space within the globe.

D is a conical cap for the globe, joined to the latter by means of a screw-thread in substantially the ordinary manner, said cap inclosing within it the ring $d$ and diaphragm $g$, the diameters of which two parts being a little less than the internal diameter of the cap.

$k$ is a stem passing vertically through the upper part of the cap, to which is secured some convenient handle for operating it—for instance, a common hand-wheel, E. The stem and hand-wheel are fitted to turn together by any ordinary means—as, for instance, a key or a clamping screw-nut, $l$.

Within the cap the stem $k$ is expanded at $s$, and internally threaded to receive the threaded portion of the stud $h$ above the diaphragm. The stem has a journal-bearing at $n$ in the upper end of the cap, so that it may be turned upon its axis therein by means of the hand-wheel. The lever or bar $c$ is joined to the valve by some simple means—as, for instance, by being inserted between lugs $o$, projecting from the back side of the valve and held by a transverse pin, $p$.

Now it will be understood that as the stem is turned one way or the other by means of the hand-wheel the stud will be raised or depressed, carrying with it the diaphragm and causing the lower end of the lever, with the attached valve, to move laterally toward or from the seat $r$ of the opening $b$. The arms of the lever, being unequal in length, cause the valve to move through a proportionately greater space than the diaphragm. The cap is formed with an internal shoulder, $u$, to bind the diaphragm and ring firmly down upon the globe. The joints between the ring and the globe and the ring and the diaphragm are made steam-tight, so that when the cap is firmly screwed to place the inclosure within the globe is complete, save as to the inlet and outlet openings through the respective pipes B and C.

The portion $t$ of the stud below the diaphragm may be formed with an eye to receive the rounded arm $i$ of the lever, or it may be bifurcated to receive between its divided parts the arm $i$, made flat, as shown in Figs. 4 and 5. The manner of connecting these parts is a matter of mechanical skill and not invention.

I prefer to make the diaphragm with annular corrugations instead of being plain, as shown, though I do not wish to confine myself to any particular form of diaphragm.

By proportioning the area of the valve acted upon by the pressure within the globe to the area of the diaphragm subjected to the same pressure the valve may be balanced—that is to say, the parts may be proportioned so that the pressure against the under side of the diaphragm tending to open the valve may just equal the pressure against the valve tending to keep it closed.

The bar $c$ is formed with an extension, $t'$, below the pin $p$, to bear against the valve to prevent the latter turning down from gravity when raised off its seat. This stop $t'$ is a little apart from the back of the valve, so as to allow the latter a slight amount of free motion, but at the same time prevents the valve from swinging or turning out of place on the pin $p$ when moved back to open the passage through the opening $b$, as stated.

I claim—

1. A globe and valve therein, in combination with a cap for the globe, a stem in the cap, a handle secured to the stem, a diaphragm, a stud rigid with the diaphragm operated by the handle, and a connecting bar or lever within the globe for said stud and valve, substantially as shown and described.

2. A globe and valve, in combination with a cap for the globe, a stem held by the cap, a handle secured to the stem, a diaphragm, a stud rigid with the latter operated by the handle, and a connecting-bar for said stud and valve, said bar being formed with a stop for the valve, substantially as and for the purpose set forth.

JOHN A. CREELMAN.

Witnesses:
E. B. WHITMORE,
M. L. MCDERMOTT.